United States Patent [19]

Marx

[11] 4,055,984

[45] Nov. 1, 1977

[54] DEVICE FOR DETECTING LEAKS IN FLEXIBLE ARTICLES

[75] Inventor: Joachim Marx, Wesseling, Germany

[73] Assignee: Leybold-Heraeus GmbH & Co. KG, Cologne, Germany

[21] Appl. No.: 705,005

[22] Filed: July 14, 1976

[30] Foreign Application Priority Data

July 29, 1975 Germany .............................. 2533830

[51] Int. Cl.$^2$ ............................................. G01M 3/20
[52] U.S. Cl. ...................................... 73/40.7; 73/49.2
[58] Field of Search ........................... 73/40.7, 49.2, 40

[56] References Cited

U.S. PATENT DOCUMENTS

| 3,721,117 | 3/1973 | Ford et al. ............................. 73/40.7 |
| 3,949,596 | 4/1976 | Hawk .................................... 73/40.7 |

FOREIGN PATENT DOCUMENTS

| 733,348 | 7/1955 | United Kingdom ................. 73/40.7 |
| 247,578 | 11/1969 | U.S.S.R. ................................ 73/40.7 |

Primary Examiner—Richard C. Queisser
Assistant Examiner—Joseph W. Roskos
Attorney, Agent, or Firm—Spencer & Kaye

[57] ABSTRACT

A device adapted to detecting leaks in an article having readily deformable walls has conventional arrangements for performing a leak detection by overpressure or by vacuum and has a deformable backup wall for engagement with the walls of the article. The backup wall is, on its face oriented towards the article, so configured that between the backup wall and the article there is obtained a coherent fluidtight space which may be evacuated.

19 Claims, 5 Drawing Figures

DEVICE FOR DETECTING LEAKS IN FLEXIBLE ARTICLES

BACKGROUND OF THE INVENTION

This invention relates to a device for detecting leaks particularly in articles having readily deformable walls.

Generally two basic leak detection methods are known. According to the first method, the article is filled with a test gas and is maintained at a pressure that is higher than that of the surrounding environment. In case of leaks, the test gas escapes from the inside of the article outwardly and is detected there. This method can be characterized as "leak detection from inside to outside" or "leak detection by overpressure". The second leak detection method is, in essence, the reverse of the first method: the pressure difference between the inside of the article and its surroundings is so selected that the pressure within the article is lower than that of the surrounding environment. This can be effected, for example, by vacuumizing the article. According to this method the test gas normally surrounds the article and, in case of a leak, the test gas penetrates into the article and is detected by a test gas detector communicating with the inner space of the article. This method may be characterized as "leak detection from outside to inside" or "leak detection by vacuum."

The above-outlined leak detection methods, however, cannot find application in connection with articles having walls which are readily deformable, because the differential pressure necessary to perform the leak detection would attain or even exceed the stability of the walls, causing significant deformations, damages or even destruction of the walls. The confirmation of fluid-tight properties is of primary importance in a number of articles which have such readily deformable walls: thin-walled shipping or storing containers such as barrels for the shipping of products harmful to the environment, fuel reservoirs and the like which, for economic reasons, cannot be manufactured in any other manner.

SUMMARY OF THE INVENTION

It is an object of the invention to provide an improved device for detecting leaks in articles having easily deformable walls.

This object and others to become apparent as the specification progresses, are accomplished by the invention, according to which, briefly stated, the device adapted to detect leaks in an article having readily deformable walls has conventional arrangements for performing a leak detection by overpressure or by vacuum and has a deformable backup wall for engagement with the walls of the article. The backup wall is, on its face oriented towards the article, so configured that between the backup wall and the article there is obtained a coherent fluidtight space which may be evacuated.

A device structured according to the invention as outlined above is adapted to test for leaks, for example, a thin-walled hollow body. The deformable backup wall may be formed, for example, in such a manner that it surrounds the hollow body containing the test gas. By means of generating a vacuum in the space between the article and the backup wall, the latter first moves in the direction of the article and — by virtue of its particular shape — it engages the article wall from the outside while maintaining an intermediate space of reduced volume between the article and the backup wall. In this manner an excessive expansion (deformation) of the article wall is prevented and thus the danger of its bursting (destruction) is eliminated. For performing the leak detection, a test gas is introduced into the hollow article and a test gas detector is coupled to the intermediate space bounded by those sides of the article wall and the backup wall that are oriented towards one another. In case the article has a leak, the test gas penetrates from the inside of the hollow article (that is from the other side of the article wall) into the above-noted intermediate space and is detected there with the aid of the test gas detector.

The deformable backup wall makes it possible to perform the leak detection even on those articles which do not have a smooth outer surface but are provided, for example, with reinforcing ribs or grooves, since the deformable backup wall is adapted to conform to the irregular outer surface of such articles. In such a case it merely has to be ensured that subsequent to generating the vacuum, a coherent intermediate space between the article and the backup wall is obtained. Expediently, the backup wall is so designed that it is more easily deformable than the wall of the article. This does not affect the function of the backup wall as a support arrangement; its capability, however, of conforming to the irregularities of the surfaces of the article is improved. Further, with such an arrangement the backup wall can be caused to conform to articles of different dimensions.

The backup wall may be constituted, for example, of a smooth material having knubs or may be formed of a material having a corrugated shape. It is noted that the backup wall, or more particularly, its working side, may have a variety of configurations as long as it is ensured that in each instance, despite of a multi-location engagement between the backup wall and the article wall, a coherent intermediate space is provided between the backup wall and the article and that the intermediate space is generally fluidtight so that it may be vacuumized. The material of the backup wall may be rubber, synthetic material or metal, such as polyvinylchloride or stainless steel.

For performing the leak detection on hollow articles from the inside to the outside ("leak detection by overpressure"), the backup wall is expediently so formed that it surrounds the article at all sides in a hood-like manner and is provided with a coupling nipple and a lid for closing the hood. The article containing the test gas is placed within the hood which is subsequently closed fluidtight by placing the lid in position. The space between the backup wall and the hollow article is evacuated and coupled to a gas detector by means of the coupling nipple. The leak detection is performed in an integral and thus rapid manner, that is, the leak detection is effected simultaneously at all walls to be tested. The fact that the article has leaks is thus determined independently from the position or number of such leaks.

In case an article having readily deformable walls is to be tested in the reverse direction, that is, from the outside to the inside ("leak detection by vacuum"), the backup wall is so designed that it engages the walls of the article from the inside. With this arrangement the leak detection is performed by first spraying the article with the test gas from the outside. In case of leaks, the test gas penetrates into the space defined by the inner wall faces of the article and the backup wall and is sensed there by a test gas detector coupled to that space.

Further, the invention makes possible to perform leakage tests on diaphragms, foils and other pressure difference-sensitive surfaces. In such a case the backup wall is expediently planar in its general course and has a configuration to again obtain a closed space between the article and the backup wall. As before, a test gas detector communicates with the closed space.

DESCRIPTION OF THE PREFERRED EMBODIMENTS

Figure 1:
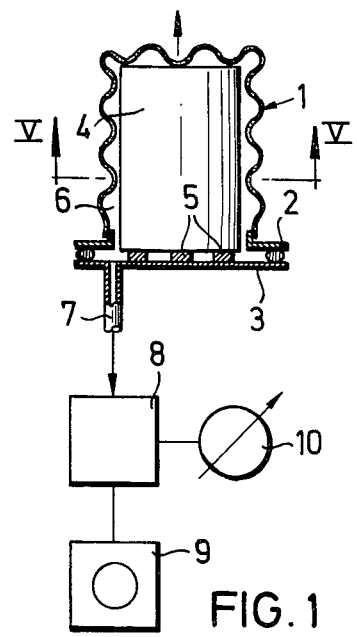
FIGS. 1 through 4 are schematic sectional side elevational views of four preferred embodiments of the invention.

Turning to FIG. 1, the embodiment illustrated therein comprises a hood generally designated at 1, having a bottom perimeter at which it is attached to a flange 2. The latter, in turn, cooperates with a lid 3 for closing off the inner space of the hood. The lid 3 may be releasably attached to the flange 2 by means of any suitable conventional securing arrangement. The walls of the hood 1 form a backup wall for engaging the outer side of an article 4 positioned within the hood. The article 4 may be, for example, of cylindrical shape. The hood 1 is made of an elastic material and has a corrugated (wavy) configuration. The closure 3 is formed of a smooth material provided with knubs 5. Thus, between the article 4 and the backup wall constituted by the hood 1 there is obtained a coherent space 6 which is connected by means of a nipple 7, provided in the closure 3, to a test gas detector 8 of known structure and a vacuum pump 9. The detector 8 is coupled to a display device 10 for indicating the presence of the test gas in the space 6.

Figure 5:
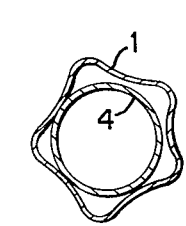
FIG. 5 is a sectional view taken along line V—V of FIG. 1.

A "leak detection by overpressure" is performed in the following manner with the aid of the device shown in FIG. 1:

The article 4 containing test gas is introduced into the hood 1, whereupon the latter is closed by placing the lid 3 in position. Thereafter the space 6 is connected to the vacuum pump 9 which vacuumizes the space 6 for generating a differential pressure necessary for conducting the leakage test. The deformable backup wall of the hood 1, by virtue of the pressure difference between the space 6 and the surrounding environment, collapses inwardly and engages the walls of the article 4 with the crests of the corrugations so that the latter cannot undergo harmful deformations. In order to ensure that the coherence of the space between the backup wall and the article is maintained, the crest lines are themselves of wavy configuration (FIG. 5), so that each crest line engages the article in an interrupted manner, that is, at a plurality of spaced locations. In case the article 4 is not fluidtight, test gas will escape from the inside of the article into the space 6 where it is detected by the test gas detector 8 and such detection is indicated by the display device 10.

Figure 2:
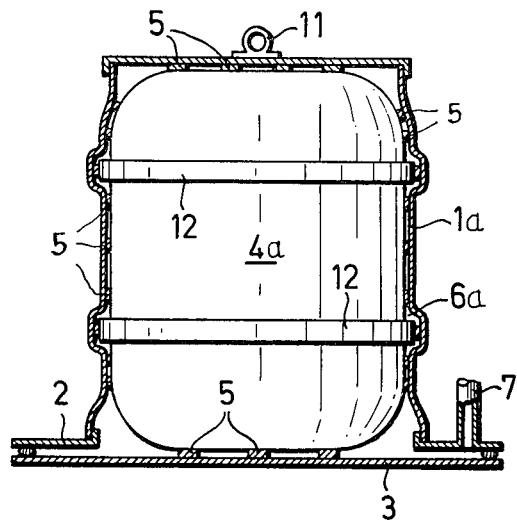

The embodiment illustrated in FIG. 2 is adapted to be used with articles which have smooth floors but nonplanar lateral walls. The device has a structure essentially corresponding to that described in connection with FIG. 1. One of the differences resides in the structure of the upper radial face of the hood which in the embodiment shown in FIG. 2, is formed of a deformable lateral wall 1a constituting a backup wall and a rigid, smooth top lid. The inner side of the top lid and the backup wall 1a are provided with knubs 5 for engaging the article 4a. The top lid further has an external eyelet 11 with the aid of which the entire hood may be lifted. A further difference, as compared with the FIG. 1 embodiment, resides in the fact that the coupling nipple 7 which serves for connecting the space 6a with the vacuum pump (not shown in FIG. 2) and with the leak detector (also not shown in FIG. 2) is arranged in the flange 2 rather than in the closure 3 as was the case in the FIG. 1 embodiment. The article 4a here has circumferential enlargements (ribs) 12 which serve as reinforcements. Since, however, the walls 1a of the hood are deformable (expediently more easily deformable than the walls of the article), they are capable of conforming to the irregular lateral surface of the article 4a without difficulty. Thus, the leak detection can also be performed in a simple manner in the case of an article 4a of the type shown in FIG. 2.

Figure 3:
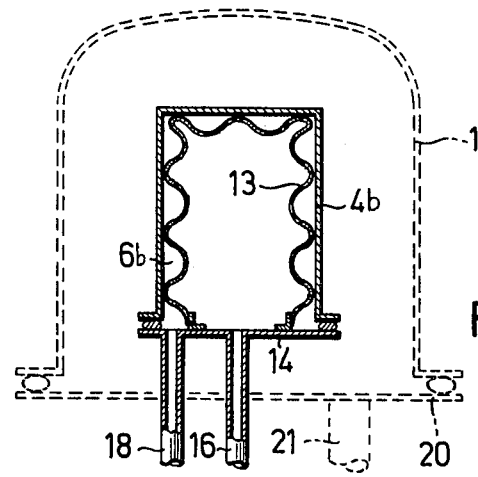

With the embodiment illustrated in FIG. 3, a "leak detection by vacuum", that is, a leak detection from the outside to the inside may be performed on articles with easily deformable walls. The backup wall 13 of the device is adapted to engage the inner wall faces of the article 4b and is, for this purpose, attached in a vacuumtight manner to a base closure 14. Also, the base closure 14 closes the opening of the article 4b in a fluidtight manner. The inner volume surrounded by the backup wall 13 communicates with the ambient atmosphere by means of coupling nipples 16. Or, the coupling nipple 16 may be attached to a source of compressed air. In case the article is of tubular shape, the upper radial face of the backup wall structure may be formed as a radial lid which closes in a vacuumtight manner the upper radial face of the article during the leak detection. In case the article has only a very small opening, but it is nevertheless desired to perform a leak detection from the outside towards the inside, the backup wall has to be designed in such a manner that it is capable of being introduced through the small opening of the article. By virtue of generating a low pressure in the space between the backup wall 13 and the article 4b, the backup wall 13 expands and engages the inside wall faces of the article 4b. Thus, again, between the article 4b and the backup wall 13 there is obtained a space 6b which is coupled through a nipple 18 (provided in the closure 14) to the test gas detector.

The leak detection with a device designed according to FIG. 3 is performed by first spraying the article 4b with test gas from the outside. In case leaks are present, the test gas penetrates into the evacuated space 6b and can be detected there. This arrangement thus offers the possibility of performing the leak detection again in an integral manner in case the entire device is placed within a dome 19 (shown in phantom lines) or a similar enclosure. The dome 19 is closed by a removable lid 20. The nipples 16 and 18 pass through the closure 20 and the test gas is introduced through a coupling nipple 21 provided in the closure 20. In order to increase the pressure difference (to the required magnitude for conducting the leak detection) between the vacuum in the space 6b and the pressure in the space which is external to the article 4b and which is surrounded by the dome 19, a test gas overpressure may be generated within the dome 19. It is noted that for assisting an outward expansion of the flexible backup wall 13, particularly for the purpose of supporting a tube-shaped article, the inner space surrounded by the cylindrical backup wall can be pressurized through the nipple 16.

Figure 4:
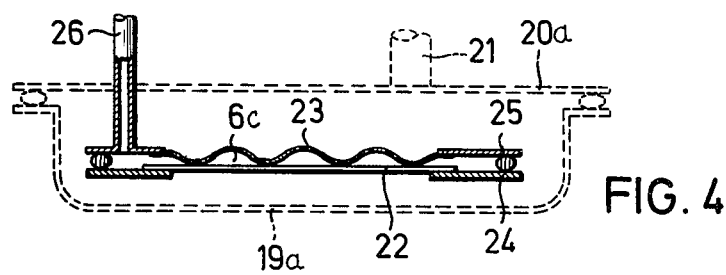

In FIG. 4 there is shown an embodiment which is particularly adapted to perform the leak detection on articles having the shape of a foil, diaphragm or the like. The diaphragm 22 to be tested is engageable by the backup wall 23. With the aid of flange members 24 sealingly engaging the diaphragm 22 and flange members 25 affixed to the flexible backup wall 23, in this embodiment too, a fluidtight intermediate space 6c is provided which, through a coupling nipple 26, may be connected to a vacuum source and a test gas detector. By vacuumizing the space enclosed by the backup wall 23 and the diaphragm 22, the flexible backup wall 23 is, at spaced locations, forced into a supporting engagement with the diaphragm 22 and further, the required pressure difference between the pressures at the one and the other side of the diaphragm is obtained for performing the leak detection. Thus, in case of a leak in the diaphragm 22, the test gas with which the diaphragm 22 had been sprayed from the outside, penetrates into the space 6c where it is sensed by the test gas detector (not shown) connected to the coupling nipple 26. It is further feasible to place the entire device within a dome 19a and closing the latter by a closure 20a for performing the leak detection in an integral manner as with the FIG. 3 embodiment.

As it is thus apparent from the FIG. 4 embodiment, the invention makes possible a "leak detection by overpressure" and a "leak detection by vacuum" not only on any type of thin-walled containers, but also on diaphragms and other differential pressure-sensitive flat members. In all instances the device may be arranged for permitting the performance of an integral leak detection which means that the leak detection can be performed very rapidly. Thus, the device according to the invention is particularly adapted for use as the last station (check point) in a manufacturing chain.

It will be understood that the above description of the present invention is susceptible to various modifications, changes and adaptations, and the same are intended to be comprehended within the meaning and range of equivalents of the appended claims.

What is claimed is:

1. A device for detecting leaks in an article which includes a readily deformable wall having opposite inner and outer sides; the improvement comprising:
   a. a flexible backup wall having opposite inner and outer sides and being arranged for positioning inside an article;
   b. closure means secured to said backup wall for defining, together with said outer side of said backup wall and the inner side of an article wall, a coherent space;
   c. means for generating a pressure difference between the pressures in said coherent space and at said inner side of said backup wall for causing said backup wall to deform and to engage, with its outer side, the inner side of the article wall for supporting the article wall while maintaining the coherence of said space;
   d. means for generating a pressure difference between the pressures in said coherent space and at the outer side of the article wall for causing test gas to penetrate into said coherent space through any leak in the article wall; and
   e. detector means communicating with said coherent space for sensing test gas therein.

2. A device as defined in claim 1, wherein said closure means includes a base closure to which said backup wall is attached; said backup wall surrounding and defining an internal volume; said base closure including means for closing fluidtight the article opening through which said backup wall extends into the article; and a coupling nipple provided in said base closure for maintaining communication between said detector means and said coherent space.

3. A device as defined in claim 2, further comprising an additional coupling nipple provided in said base closure for maintaining communication between said internal volume and said means for generating a pressure difference between the pressures in said coherent space and at said inner side of said backup wall; said inner side of said backup wall being oriented towards said internal volume.

4. A device as defined in claim 3, further comprising a fluidtight dome means surrounding said backup wall and accommodating the article; said coupling nipples projecting fluidtight through said dome means; and means for introducing test gas into said dome means externally of the article.

5. A device for detecting leaks in an article which essentially consists of a readily deformable signle planar wall having opposite first and second sides; the improvement comprising:
   a. a flexible backup wall having opposite first and second sides and a generally planar course;
   b. closure means secured to said backup wall for defining, together with said first side of said backup wall and the first side of the article wall, a coherent space; said closure means including a flange member for engaging perimetrical portions of the article wall;
   c. means for generating a pressure difference between the pressures in said coherent space and at said second side of said backup wall for causing said backup wall to deform and to engage with said first side the first side of the article wall for supporting the article wall while maintaining the coherence of said space;
   d. means for generating a pressure difference between the pressures in said coherent space and at the second side of the article wall for causing test gas to penetrate into said coherent space through any leak in the article wall;
   e. detector means communicating with said coherent space for sensing test gas therein; and
   f. a coupling nipple for maintaining communication between said coherent space and said detector means.

6. A device as defined in claim 5, further comprising a fluidtight dome means surrounding said backup wall and accommodating the article; said coupling nipple is projecting fluidtight through said dome means; and means for introducing test gas into said dome means externally of the article.

7. A device for detecting leaks in an article which includes a readily deformable wall having opposite first and second sides; the improvement comprising:
   a. a flexible backup wall having opposite first and second sides;
   b. a plurality of spaced article-engaging means provided on said first side of said backup wall;
   c. closure means secured to said backup wall for defining, together with said first side of said backup wall and the first side of an article wall, a coherent space;
   d. means for generating a pressure difference between the pressures in said coherent space and at said second side of said backup wall for causing said backup wall to deform and to contact, with said article-engaging means, the first side of the article wall for supporting the article wall at a plurality of predetermined spaced locations while maintaining the coherence of said space;

e. means for generating a pressure difference between the pressures in said coherent space and at the second side of the article wall for causing test gas to penetrate into said coherent space through any leak in the article wall; and f. detector means communicating with said coherent space for sensing test gas therein.

8. A device as defined in claim 7, wherein said means for generating a pressure difference between the pressures in said coherent space and at said second side of said backup wall and said means for generating a pressure difference between the pressures in said coherent space and at the second side of the article wall comprise a vacuumizing means for generating a vacuum in said coherent space.

9. A device as defined in claim 7, wherein at least said first side of said flexible backup wall is made of rubber.

10. A device as defined in claim 7, wherein at least said first side of said flexible backup wall is made of a synthetic material.

11. A device as defined in claim 7, wherein at least said first side of said flexible backup wall is made of a metal.

12. A device as defined in claim 7, wherein said backup wall has a greater flexibility than that of the article wall.

13. A device as defined in claim 7, wherein said backup wall has the shape of a hood defining an internal volume for accommodating the article; said closure means including a flange member secured to perimetrical edge portions of said backup wall and a lid removably secured to said flange member.

14. A device as defined in claim 13, further comprising a coupling nipple provided in said flange member for communicating with said internal volume.

15. A device as defined in claim 13, further comprising a coupling nipple provided in said lid for communicating with said internal volume.

16. A device as defined in claim 7, wherein said plurality of spaced article-engaging means comprise knubs.

17. A device as defined in claim 7, wherein said first side of said backup wall has a corrugated configuration having alternating crests and valleys and said plurality of spaced article-engaging means is formed of said crests.

18. A device as defined in claim 17, wherein each crest has a wavy course for engaging the article wall along a plurality of spaced locations.

19. A device for detecting leaks in an article which includes a readily deformable wall, comprising:

a. means for generating a pressure difference between the pressures at opposite sides of the article wall for causing test gas to pass from the relatively high pressure side to the relatively low pressure side through any leak in the article wall;

b. detector means for sensing test gas at said relatively low pressure side;

c. a flexible backup wall for engaging the article wall; and d. a plurality of spaced article-engaging means carried by that side of said flexible backup wall which is oriented towards the article for maintaining at all times a coherent space between said backup wall and the article.

* * * * *